United States Patent
Yamagata (12) 
(10) Patent No.: US 6,389,212 B1
(45) Date of Patent: May 14, 2002

(54) JUNCTION CONNECTING DEVICE FOR FIBER CONNECTORS

(75) Inventor: Akira Yamagata, Takefu (JP)

(73) Assignee: Meiyu-Giken Co., Ltd., Fukui (JP)

( * ) Notice: Subject to any disclaimer, the term of this patent is extended or adjusted under 35 U.S.C. 154(b) by 0 days.

(21) Appl. No.: 09/633,140

(22) Filed: Aug. 4, 2000

(30) Foreign Application Priority Data

Aug. 6, 1999 (JP) ............................................. 11-223832

(51) Int. Cl.$^7$ .............................. G02B 6/00; G02B 6/36
(52) U.S. Cl. ........................................ 385/135; 385/53
(58) Field of Search ............................. 385/53, 58, 59, 385/62, 63, 65, 69, 75, 83, 70, 71, 77, 135, 139; 439/713, 716, 385

(56) References Cited

U.S. PATENT DOCUMENTS

| | | | |
|---|---|---|---|
| 4,887,876 A | * 12/1989 | Fricke et al. ............... | 350/96.2 |
| 4,915,641 A | * 4/1990 | Miskin et al. ............... | 439/247 |
| 5,455,744 A | * 10/1995 | Watanabe .................... | 361/801 |
| 5,497,444 A | * 3/1996 | Wheeler ...................... | 385/135 |
| 5,629,831 A | * 5/1997 | Eggert et al. ................ | 361/624 |
| 5,716,241 A | * 2/1998 | Hennemann et al. ........ | 439/716 |
| 5,717,812 A | * 2/1998 | vandenEnden et al. ..... | 385/134 |
| 6,076,973 A | * 6/2000 | Lu ............................... | 385/60 |
| 6,222,717 B1 | * 4/2001 | Waas et al. .................. | 361/119 |
| 6,241,561 B1 | * 6/2001 | Zebermann et al. ........ | 439/716 |

FOREIGN PATENT DOCUMENTS

JP 6-60986 8/1994

* cited by examiner

Primary Examiner—Khiem Nguyen
Assistant Examiner—Chandrika Prasad
(74) Attorney, Agent, or Firm—Armstrong, Westerman & Hattori, LLP

(57) ABSTRACT

To provide a junction connecting device which is a device for joining and connecting a large number of connected, fiber lines and by which the number of constituting parts can be reduced and handling operability of the device is improved.

A junction connecting device for joining and connecting a large number of connected fiber lines to junction socket members through junction attachment plug members, the device comprising a large number of junction terminal blocks (2) each having at least one socket member (CS) and being formed into an integral structure and junction terminal block arranging and supporting means (3) for arranging and supporting the socket members through the junction terminal blocks along first and second direction lines in a matrix shape, wherein the first direction lines out of the respective direction lines of the junction terminal blocks can be moved and fixed to disposed fixed positions (P1) and maintenance positions (P2) one line at a time by a one-touch operation.

7 Claims, 11 Drawing Sheets

JUNCTION CONNECTING DEVICE FOR FIBER CONNECTORS

TECHNICAL FIELD

The present invention relates to a structure of a junction terminal block mainly used for indoor junction and a mounting structure including a substrate for mounting the junction terminal block to a wall member and particularly to a junction terminal block formed of one molded body and a junction terminal block mounting structure by which handling operability in detachably mounting the junction terminal block to the substrate and the wall member is improved.

BACKGROUND ART

As well known, as means for joining and connecting a large number of fibers, a mechanism device called a so-called fiber connector formed of a substrate and a wall member disposed at a junction and a fiber connector member having a socket body detachably mounted to the substrate and the wall member has been developed and provided, for example.

The above prior-art fiber connector device is for joining and connecting the large number of fibers and used by mounting a large number of fiber connector members to the substrate and the wall member such that the fiber connector members are standing close together in a normal design. For example, if fiber connector plugs are partially attached to and detached from the socket bodies of the fiber connector members for maintenance, the device has to be formed such that the target fiber connector members can be withdrawn from the substrate and the wall member.

Figure 1:
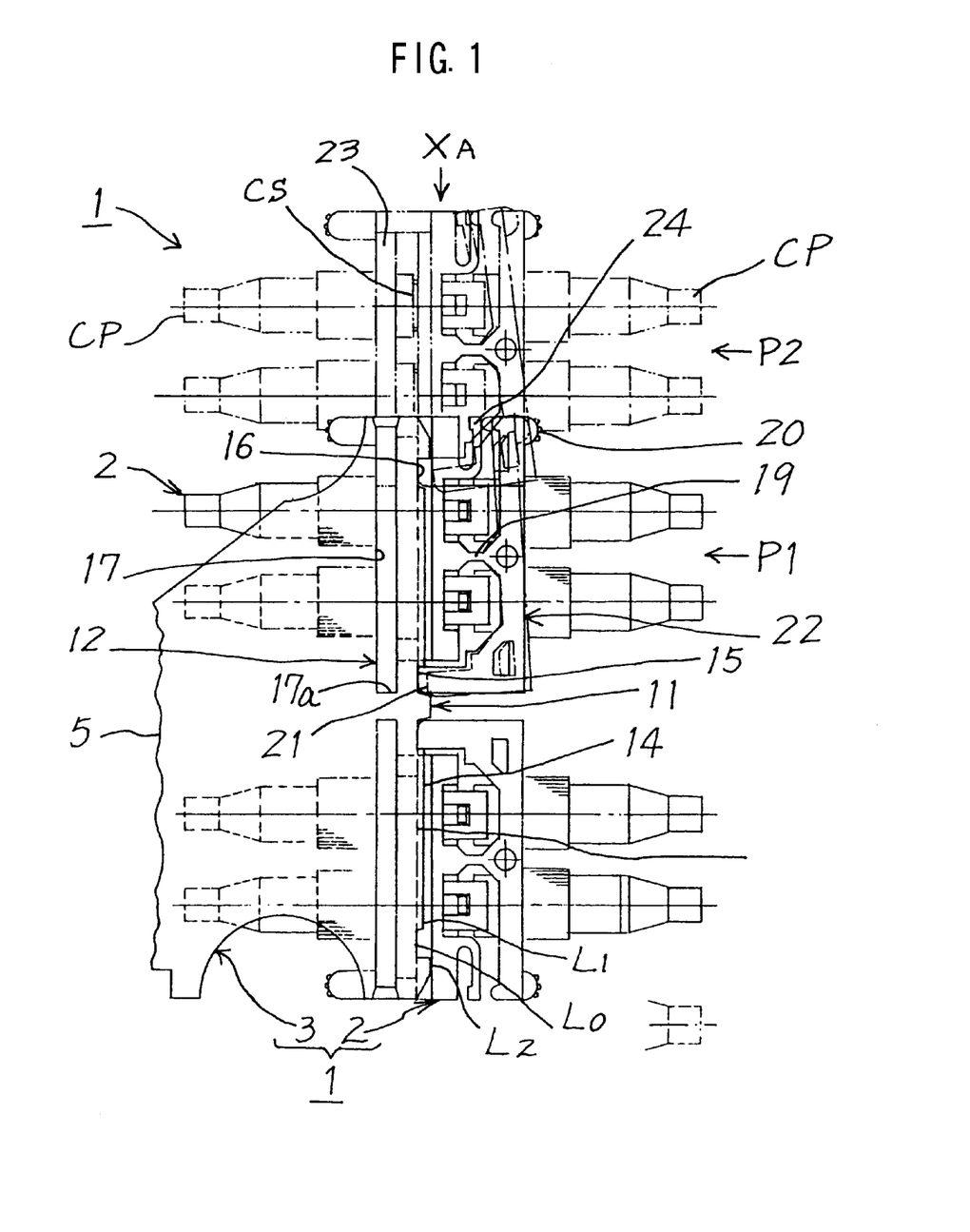
FIG. 1 is a schematic front view showing a concrete embodiment of a junction connecting device of the present invention and showing a state in which two junction terminal blocks are mounted to a double-type wall member and plugs are respectively connected to sockets of the respective junction terminal blocks.
Figure 2:
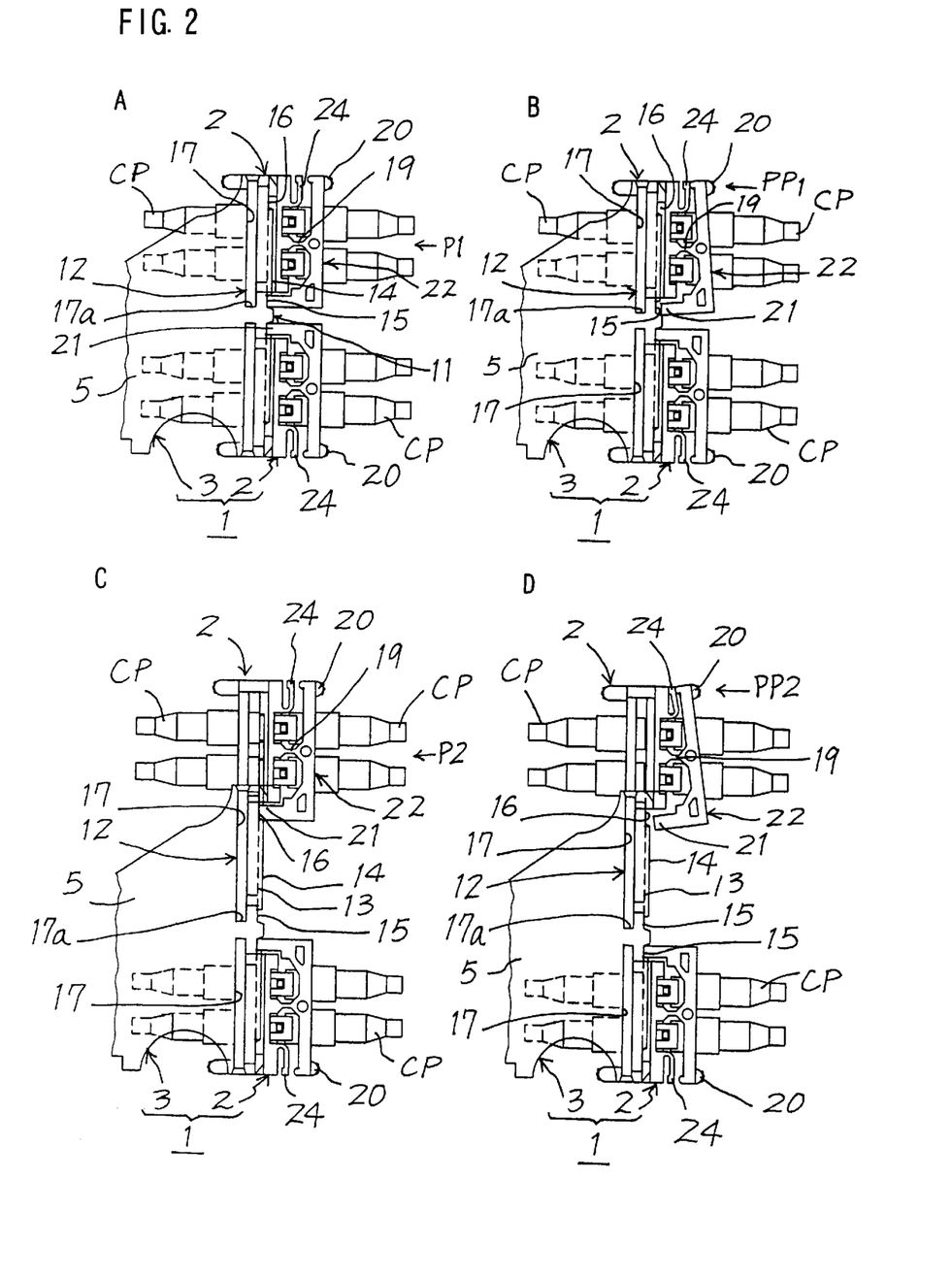
FIG. 2 is based on FIG. 1 and shows an operating form of the junction terminal blocks with respect to the double-type wall member.
Figure 3:
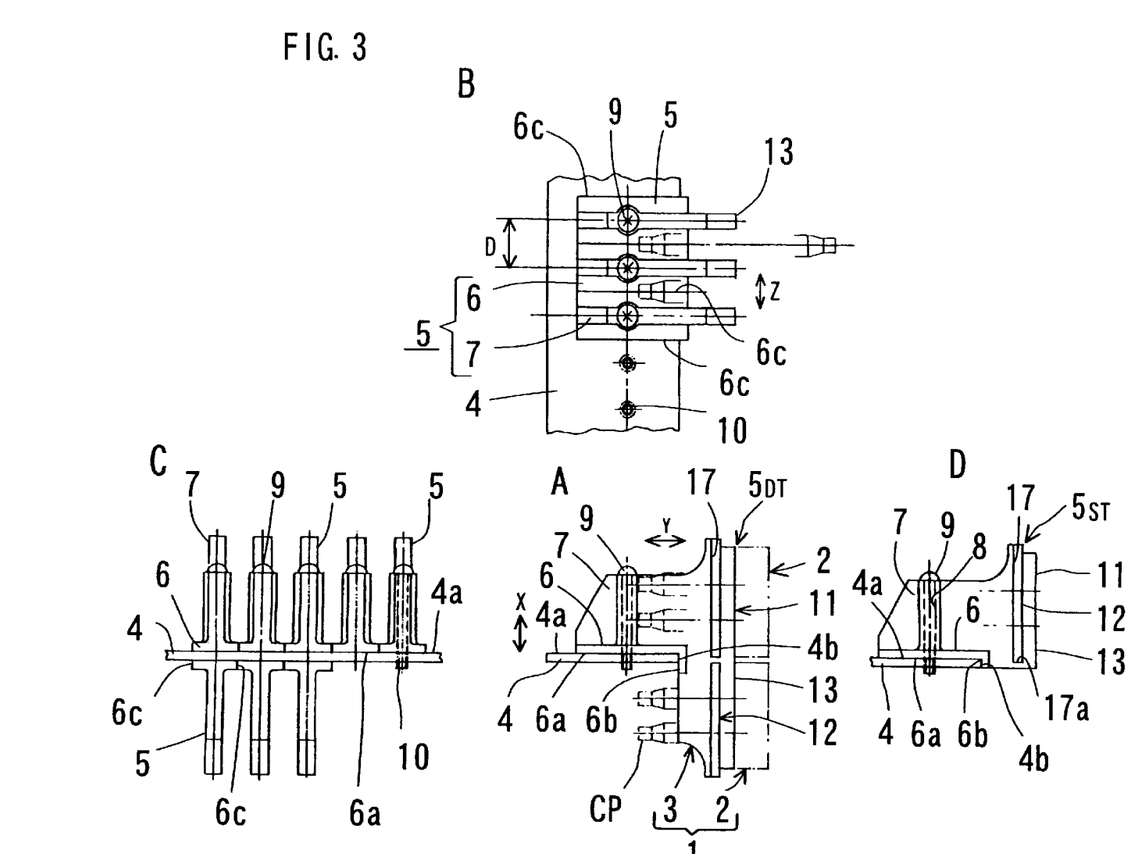
FIG. 3 shows a form of disposition of the wall members on a substrate.
Figure 4:
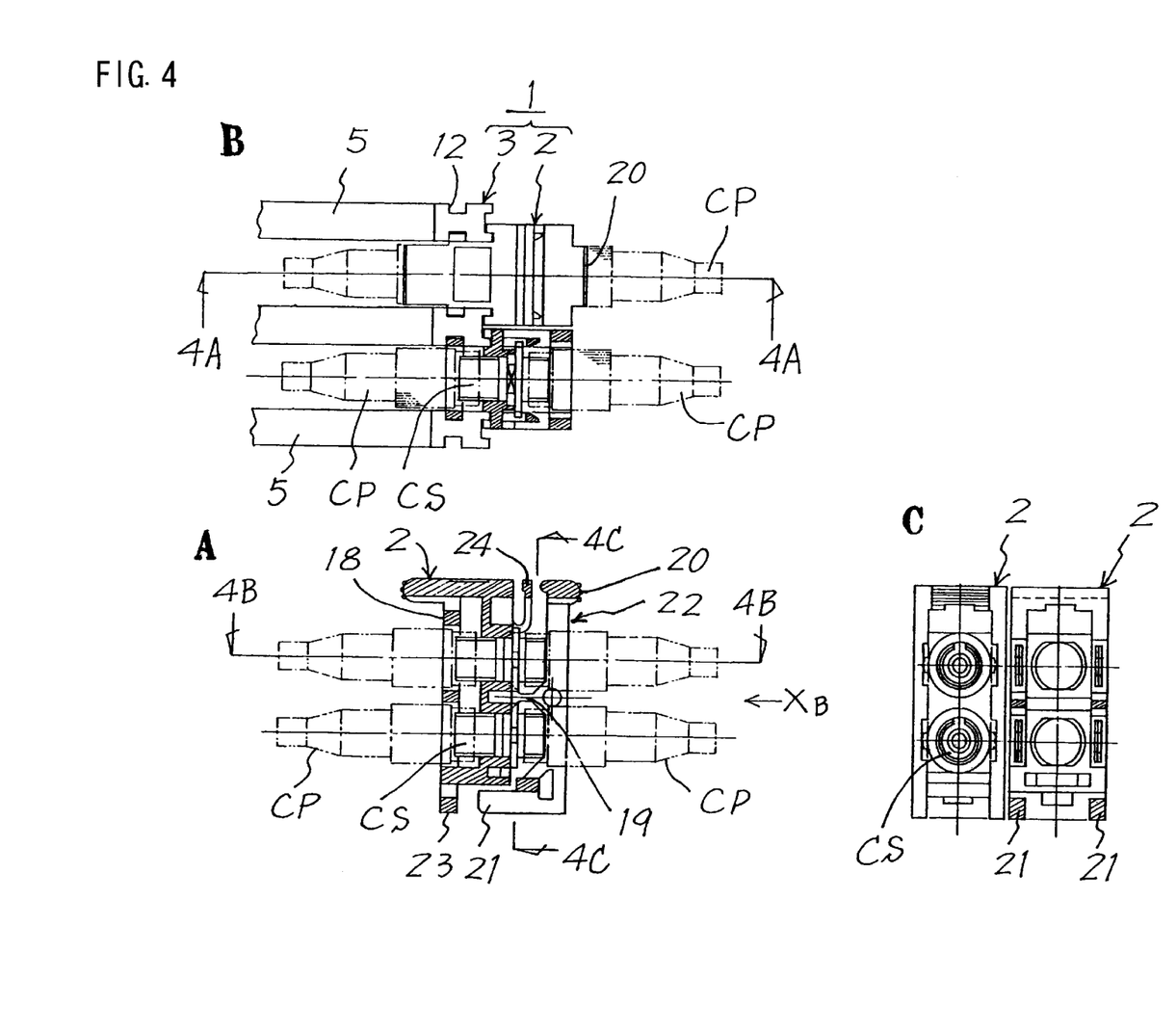
FIG. 4 shows a state in which two structure examples of the junction terminal block of the invention are arranged with attachment plugs represented by a phantom line.
Figure 5:
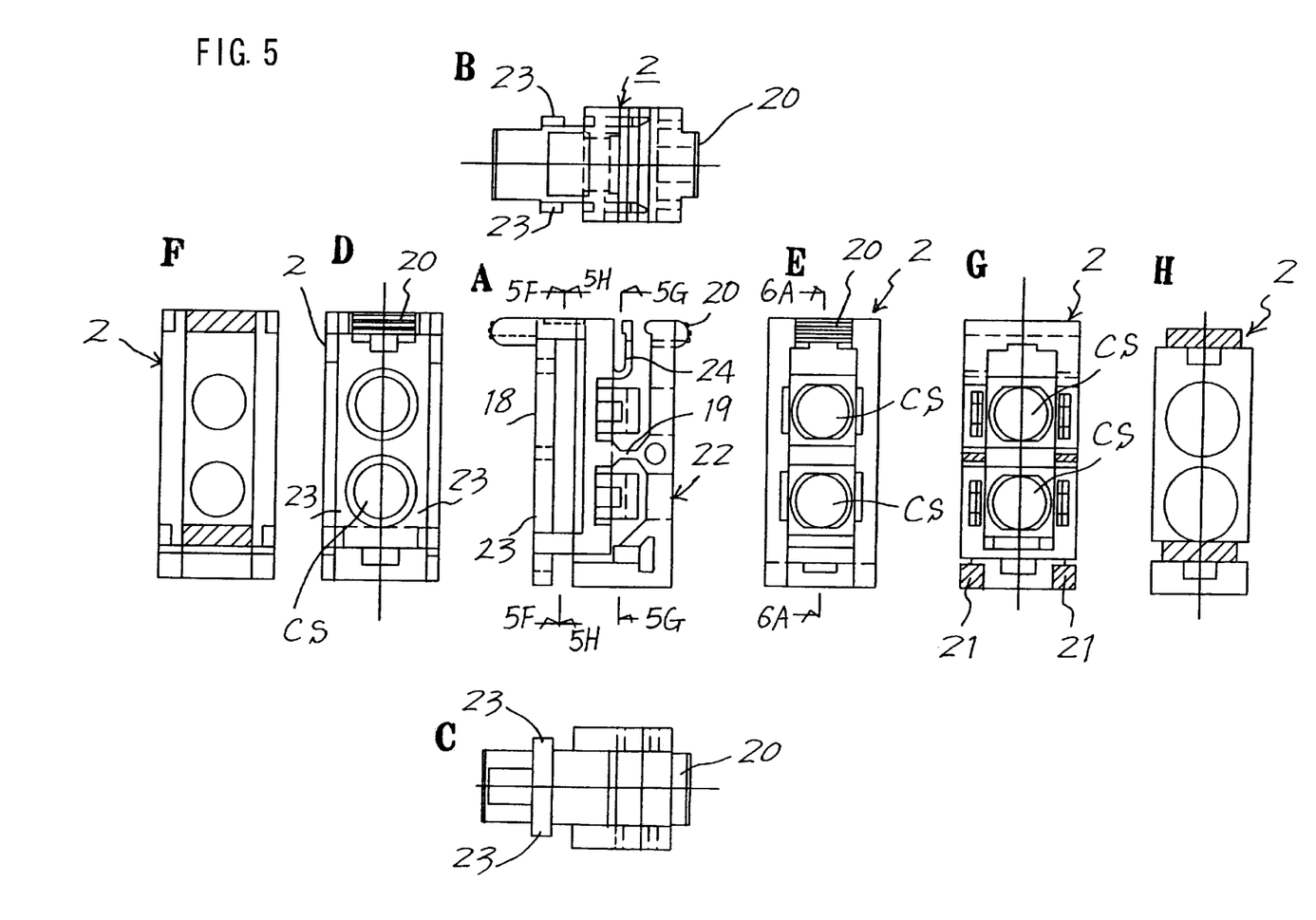
FIG. 5 shows details of a concrete structure example of the junction terminal block of the invention.
Figure 6:
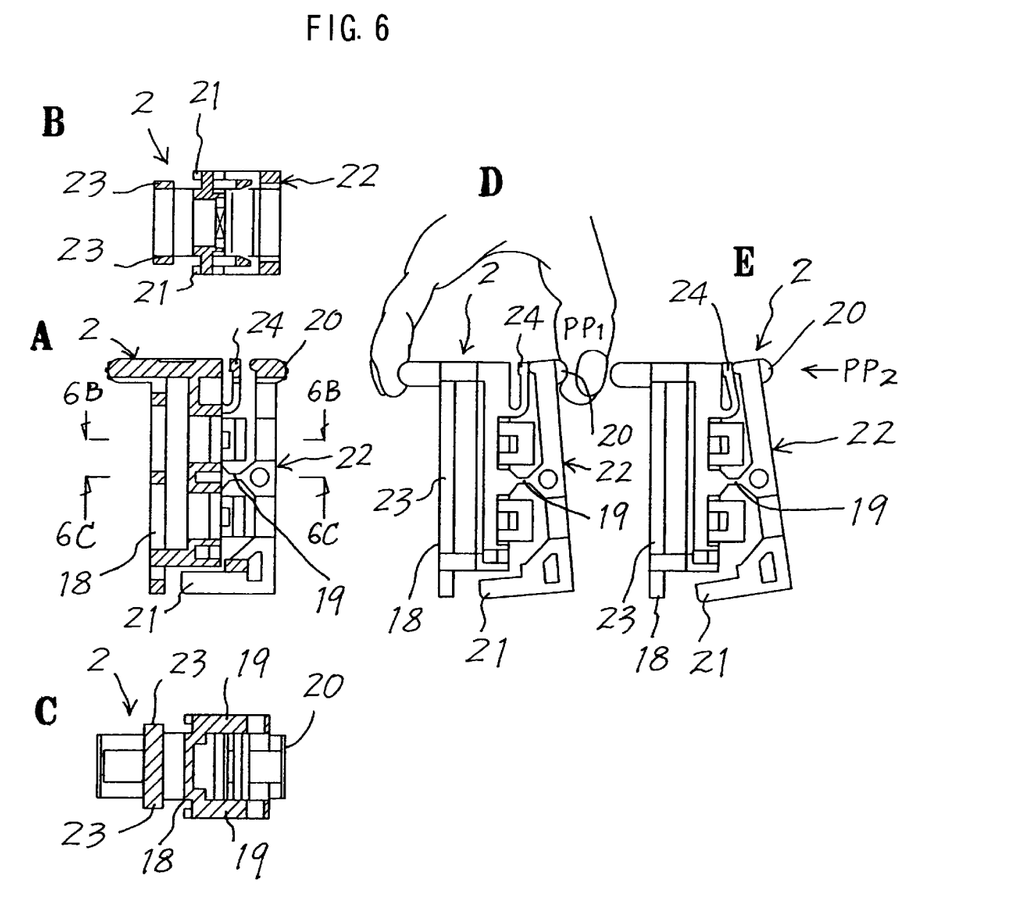
FIG. 6 shows details of the concrete structure example of the junction terminal block and shows an operating form of the junction terminal block.
Figure 7:
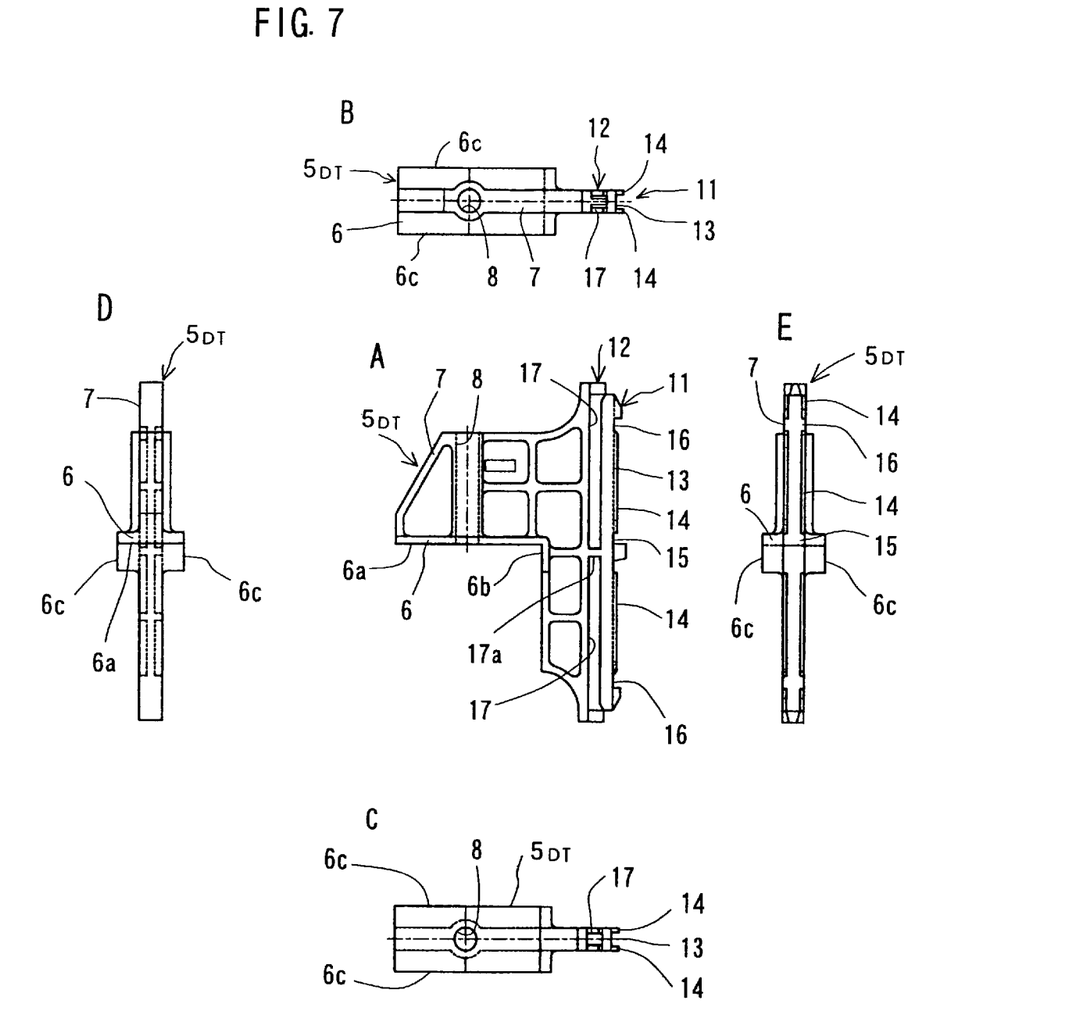
FIG. 7 shows details of a concrete embodiment of a double-type wall member.
Figure 8:
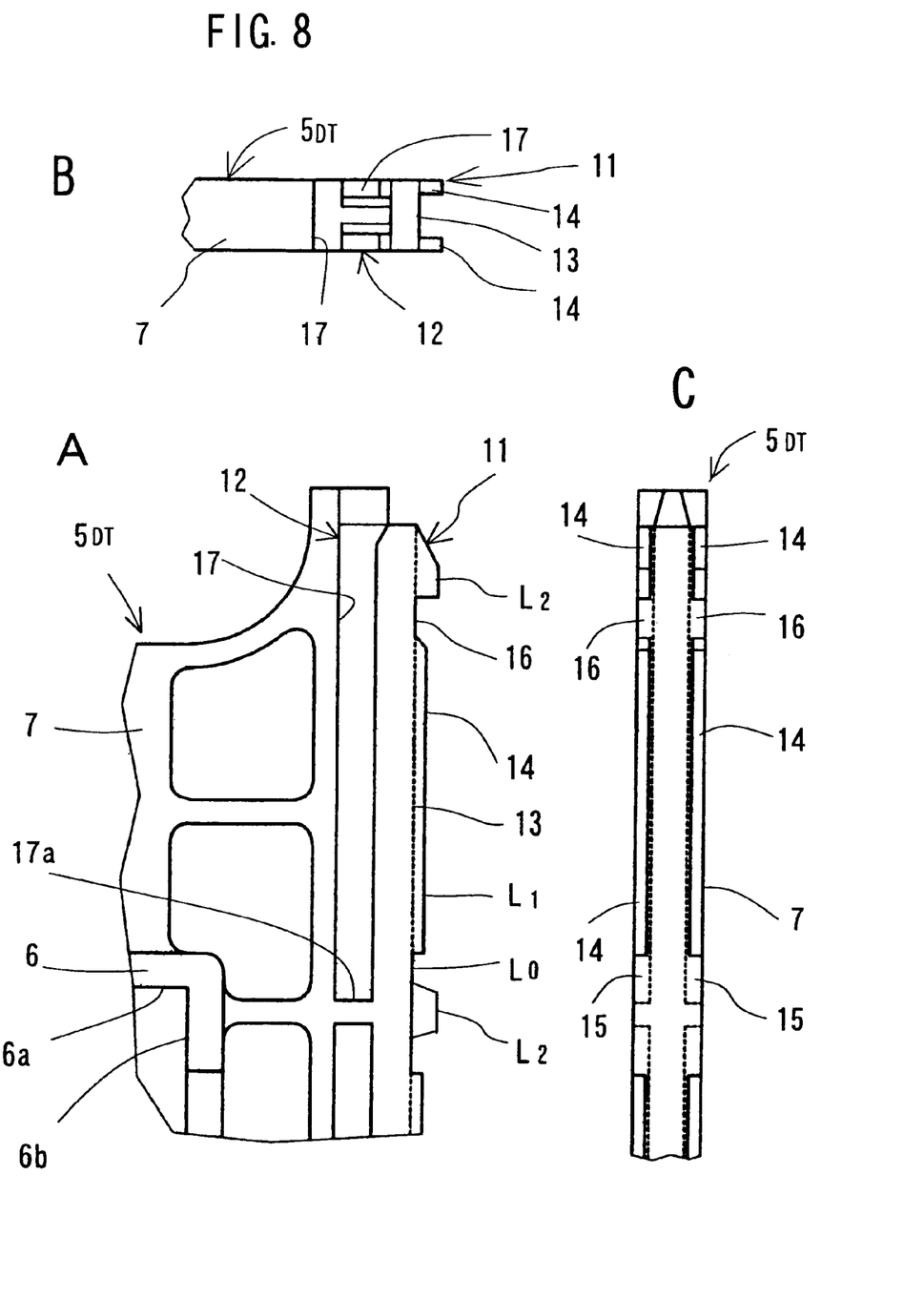
FIG. 8 is an enlarged view of an essential portion of the double-type wall member shown in FIG. 7.
Figure 9:
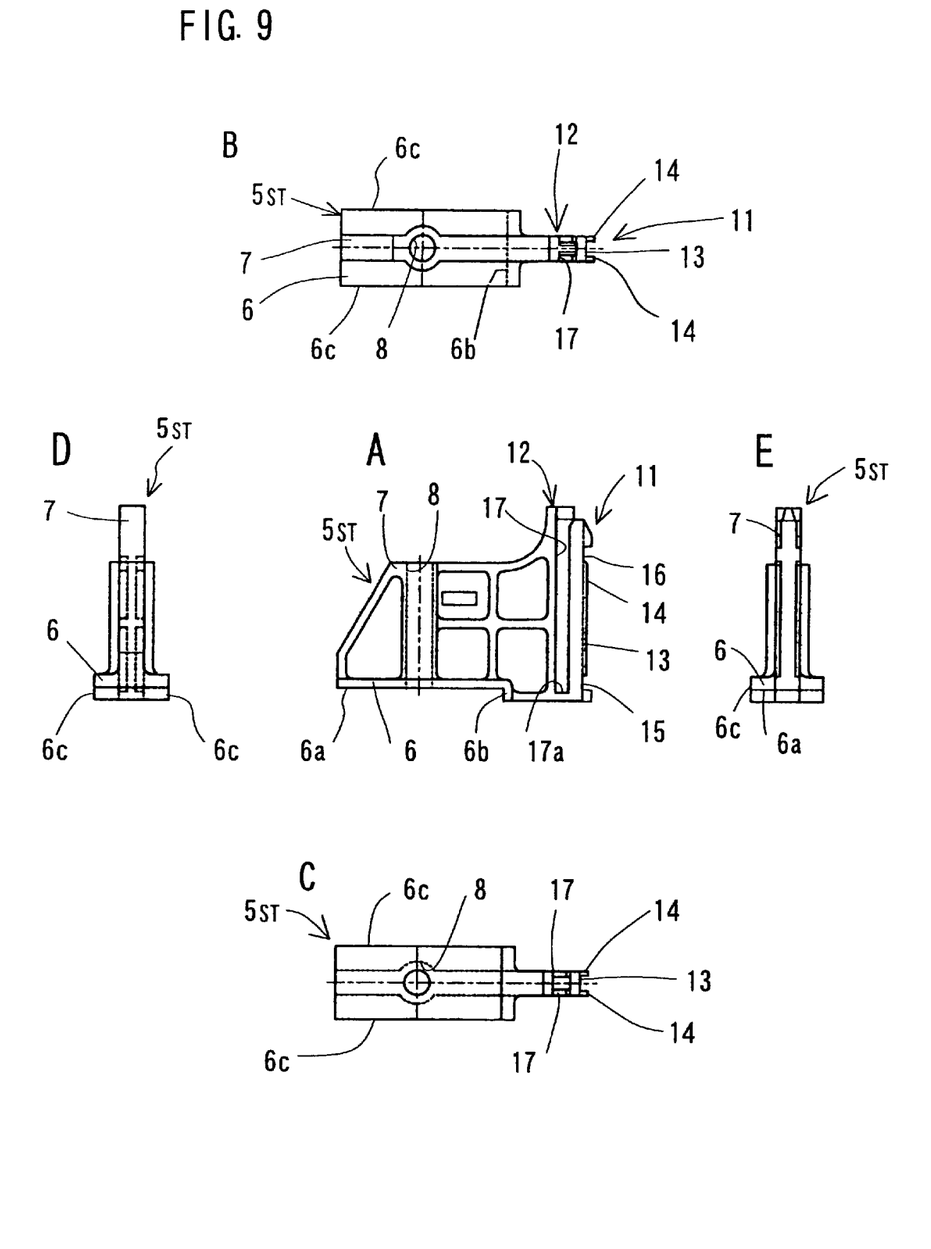
FIG. 9 shows an embodiment of a single-type wall member.
Figure 10:
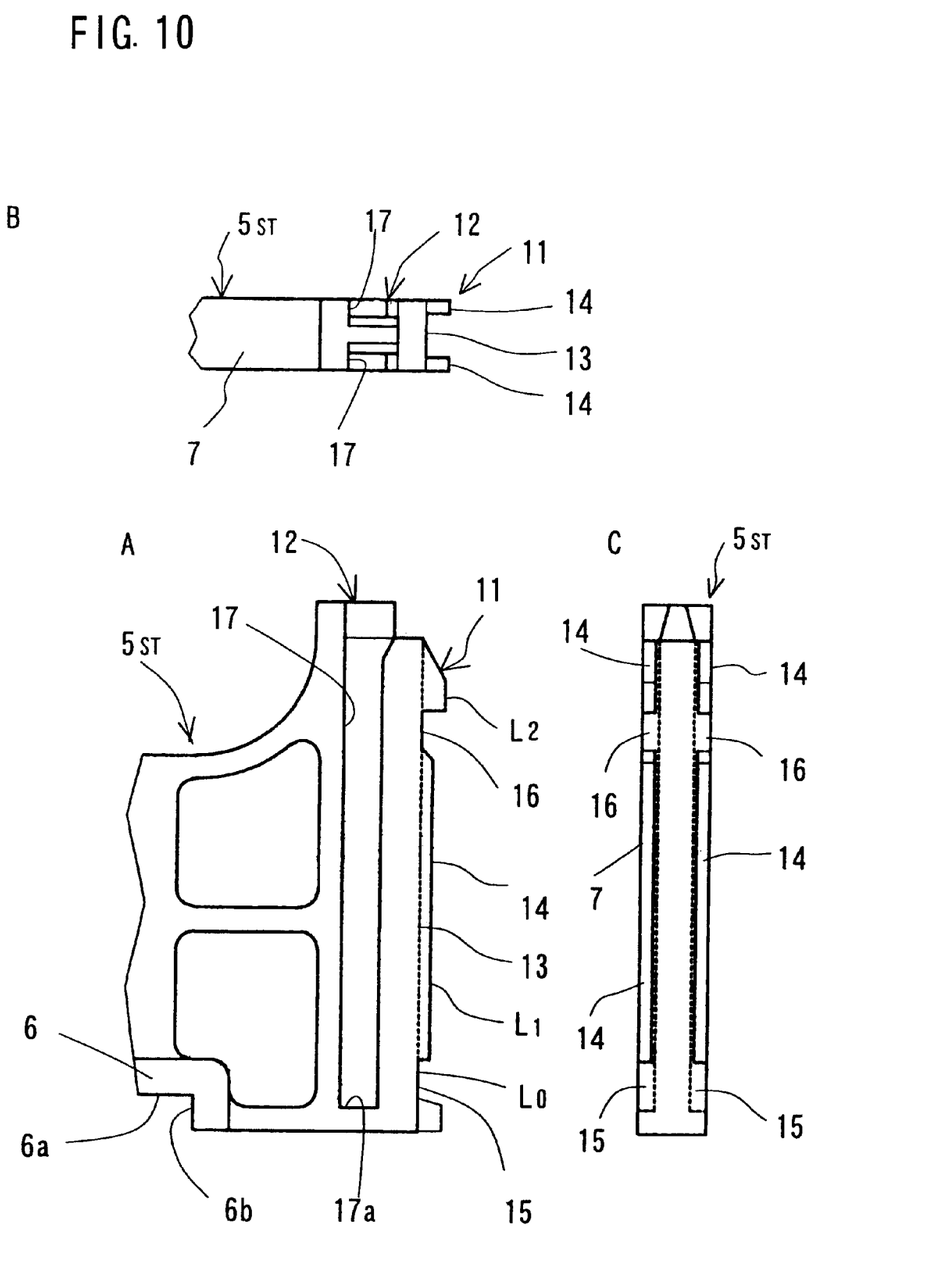
FIG. 10 is an enlarged view of an essential portion of the single-type wall member shown in FIG. 9.
Figure 11:
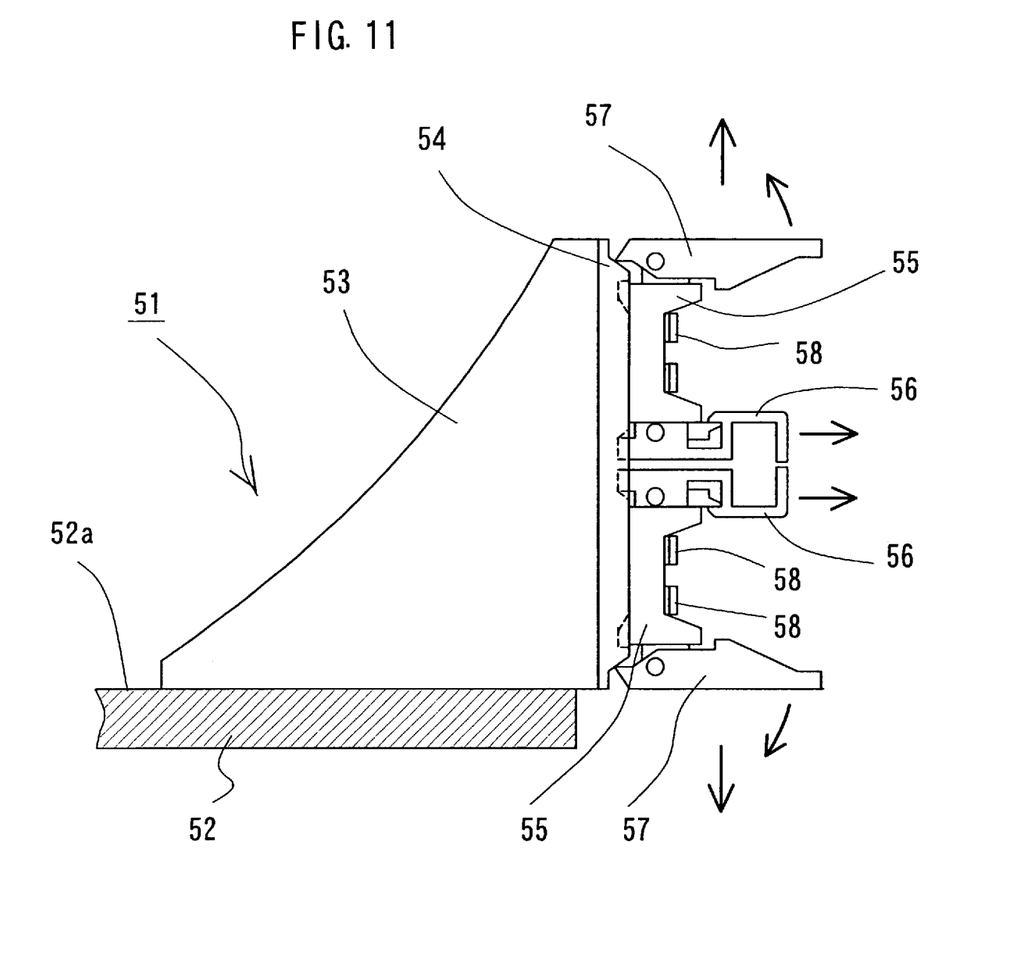
FIG. 11 shows a typical structure example of a prior-art fiber connector device and is a schematic front view showing the entire fiber connector device formed of a double-type wall member.

On the above condition, the prior-art fiber connector device has to be formed of a large number of constituting members as shown in FIG. 11 and has many problems such as a great increase in manufacturing cost, a complicated assembly operation of the respective constituting members, difficulty in disposing the substrate and the wall member, and complicated attaching and detaching operations of the fiber connector member to and from the substrate and the wall member.

In other words, the prior-art fiber connector device 51 shown in FIG. 11 is formed of a combination of the substrate 52 as a base for mounting, a plurality of wall members 53 standing at regular intervals D and in parallel with one another on one face 52a of the substrate 52, fiber connector members 55 mounted between the wall members 53, 53 through guide rail portions 54, 54 provided to the wall members 53, 53 such that the fiber connector members 55 are detachable in a sliding manner, hook means 56 for disposing the fiber connector members 55 between the wall members 53 and 53, and releasing operation lever means 57 for releasing.

The fiber connector device 51 shown in FIG. 11 is an example of an upper and lower two-level structure in which two fiber connector members 55, 55 can be mounted to upper and lower portions. One fiber connector member 55 has two connector sockets 58, 58 and connector plugs are respectively plugged in the connector sockets 58, 58 from axially back sides of the connector sockets 58, 58 to connect the fibers through the connector plugs. Therefore, in the structure example shown in FIG. 11, four fiber lines can be connected in one unit formed vertically. By laterally combining N units, it is possible to connect a large number of, i.e., 4×N fiber lines.

The prior-art fiber connector device 51 shown in FIG. 11 is formed of the substrate 52, the plurality of wall member 53, the fiber connector members 55, the hook means 56, and the releasing operation lever means 57 and the hook means 56 is further formed of a hook member, a hook slider member, and a spring member. Therefore, the device 51 requires extremely many constituting members, which results in the great increase in manufacturing cost and complicated assembly and handling.

Moreover, in the prior-art fiber connector device 51 shown in FIG. 11, in operation of repairing a specific failed circuit in maintenance, a releasing operation for releasing the fiber connector member 55 of the specific failed circuit from the substrate and the wall member is extremely complicated.

DISCLOSURE OF THE INVENTION

Therefore, as described above, the present invention provides a structure of a junction terminal block mainly used for indoor junction and a mounting structure including a substrate for mounting the junction terminal block to a wall member and particularly to a junction terminal block formed of one molded body and a junction connecting device by which handling operability in detachably mounting the junction terminal block to the substrate and the wall member is improved.

To achieve the above object, the invention forms a junction connecting device for joining and connecting a large number of connected fiber lines to junction socket members through junction attachment plug members, the device comprising a large number of junction terminal blocks each having at least one socket member and being formed into an integral structure and junction terminal block arranging and supporting means for arranging and supporting the socket members through the junction terminal blocks along first and second direction lines in a matrix shape, wherein the first direction lines out of the respective direction lines of the junction terminal blocks can be moved and fixed to disposed fixed positions and maintenance positions one line at a time by a one-touch operation.

Furthermore, the invention forms a junction connecting device wherein the junction terminal block arranging and supporting means is formed of a substrate having a reference plane and a reference end face and a plurality of wall members standing at regular intervals on the reference plane of the substrate.

Furthermore, the invention forms a junction connecting device wherein the wall member is formed of a first face portion aligned with the reference plane of the substrate, a second face portion in contact with the reference end face of the substrate, and width-direction end faces for defining a pitch width dimension in an arranging direction of the wall members when adjacent wall members are in contact with each other in an adjoining direction.

Furthermore, the invention forms a junction connecting device wherein the wall member includes engaging supporting means having a third face portion orthogonal to the first face portion and positioning, fixing, and supporting the junction terminal block in the disposed fixed position and the maintenance position along the third face portion and guide means for sliding and guiding the junction terminal block from the disposed fixed position to the maintenance position.

Furthermore, the invention forms a junction connecting device for-joining and connecting a large number of connected fiber lines to junction socket members through junction attachment plug members, the device comprising a large number of junction terminal blocks each having at least one socket member and being formed into an integral structure and junction terminal block arranging and supporting means for arranging and supporting the socket members through the junction terminal blocks along first and second direction lines in a matrix shape, wherein the first direction lines out of the respective direction lines of the junction terminal blocks can be moved and fixed to disposed fixed positions and maintenance positions one line at a time by a one-touch operation, the junction terminal block arranging and supporting means is formed of a plurality of wall members standing at regular intervals, the wall member has engaging supporting means including first and second engaging portions for fixing and supporting the junction terminal block in the disposed fixed position and the maintenance position and guide means for sliding and guiding the junction terminal block from the disposed fixed position to the maintenance position, the junction terminal block is formed of a body portion for supporting the socket member, engaging/disengaging operating means connected for a seesaw motion to the body portion through an elastically deformed connecting portion and having a pressing operating portion on one end side and an engaging member to be engaged with the engaging supporting means of the wall member on the other end side, and a guide follower to be engaged for sliding with the guide means of the wall member, and the engaging member of the junction terminal block is released from the first engaging portion of the wall member to slide the junction terminal block and is engaged with the second engaging portion of the wall member by operating the engaging/disengaging operating means of the junction terminal block.

Furthermore, the invention forms a junction connecting device wherein the engaging/disengaging operating means of the junction terminal block is operated to first and second at least two levels of pushed positions on the elastically deformed connecting portion as a fulcrum, the engaging member of the junction terminal block can be released from the first engaging portion of the wall member in the first-level pushed position, and the junction terminal block can be released from the wall member in the second-level pushed position.

Furthermore, the invention forms a junction connecting device wherein second elastically deformed means for restricting the first-level pushed position and restoring a pressing operating portion pushed into the second-level pushed position to the first-level pushed position is provided on the pressing operating portion side of the engaging/disengaging operating means of the junction terminal block.

BRIEF DESCRIPTION OF THE DRAWINGS

FIG. 2A is a schematic front view showing a state in which the junction terminal blocks are locked in disposed fixed positions, FIG. 2B is a schematic front view showing a state in which engaging/disengaging operating means of the junction terminal block is pushed into a first pushing position, FIG. 2C is a schematic front view showing a state in which the junction terminal block is locked in a maintenance position after the junction terminal block is moved along guide means of the wall member, and FIG. 2D is a schematic front view showing a state in which the engaging/disengaging operating means of the junction terminal block is pushed into a second pushing position such that the junction terminal block can be released.

FIG. 3A is a schematic front view of an example of the double-type wall member, FIG. 3B is a schematic plan view of the wall members shown in FIG. 3A, FIG. 3C is a schematic left side view of the wall members shown in FIG. 3A, and FIG. 3D is a schematic front view of an example of a single-type wall member.

FIG. 4A is a schematic sectional view taken along a line 4A—4A in FIG. 4B, FIG. 4B is a schematic plan view taken in a direction of an arrow $X_A$ in FIG. 1 with a lower unit shown in a schematic sectional view taken along a line 4B—4B in FIG. 4A, and FIG. 4C is a schematic right side view taken in a direction of an arrow $X_B$ in FIG. 4A with a right unit shown in a schematic sectional view taken along a line 4C—4C in FIG. 4A.

FIG. 5A is a schematic front view of the junction terminal block, FIG. 5B is a schematic plan view of the junction terminal block, FIG. 5C is a schematic bottom view of the junction terminal block, FIG. 5D is a schematic left side view of the junction terminal block, FIG. 5E is a schematic right side view of the junction terminal block, FIG. 5F is a schematic sectional view taken along a line 5F—5F in FIG. 5A, FIG. 5G is a schematic sectional view taken along a line 5G—5G in FIG. 5A, and FIG. 5H is a schematic sectional view taken along a line 5H—5H in FIG. 5A.

FIG. 6A is a schematic sectional view taken along a line 6A—6A in FIG. 5E, FIG. 6B is a schematic sectional view taken along a line 6B—6B in FIG. 6A, FIG. 6C is a schematic sectional view taken along a line 6C—6C in FIG. 6A, FIG. 6D is a schematic front view showing a state in which the pressing operating portion of the junction terminal block is pressed by half a stroke, and FIG. 6E is a schematic front view showing a state in which the pressing operating portion of the junction terminal block is pressed by a full stroke.

FIG. 7A is a schematic front view of the wall member, FIG. 7B is a schematic plan view of the wall member, FIG. 7C is a left side view of the wall member, and FIG. 7D is a schematic right side view of the wall member, and FIG. 7E is a right side view of the wall member.

FIG. 8A is a partially-cutaway schematic front view, FIG. 8B is a partially-cutaway schematic plan view, and FIG. 8C is a partially-cutaway schematic right side view.

FIG. 9A is a schematic front view of the wall member, FIG. 9B is a schematic plan view of the wall member, FIG. 9C is a left side view of the wall member, and FIG. 9D is a schematic right side view of the wall member, and FIG. 9E is a right side view of the wall member.

FIG. 10A is a partially-cutaway schematic front view, FIG. 10B is a partially-cutaway schematic plan view, and FIG. 10C is a partially-cutaway schematic right side view.

BEST MODE FOR EMBODYING THE INVENTION

A junction connecting device according to the present invention will be described below based on concrete embodiments shown in the drawings.

The concrete examples of the junction connecting device of the invention will be described below based on the above respective drawings. The junction connecting device 1 of the invention is a junction connecting device for joining and connecting a large number of connected fiber lines to junction socket members CS through junction attachment plug members CP and is basically formed of a combination of a large number of junction terminal blocks 2 each having the two socket members CS and formed into an integral structure and junction terminal block arranging and supporting means 3 for arranging and supporting the socket members CS in a matrix shape along first direction lines (vertical direction lines in the shown example) and second direction lines (lateral direction lines in the shown example) through the junction terminal blocks 2. The first direction lines of the junction terminal blocks 2 can be moved and fixed to disposed fixed positions P1 and maintenance positions P2 one line at a time by a one-touch operation.

The junction terminal block arranging and supporting means 3 will be described first based on FIGS. 3 and 7 to 10. The junction terminal block arranging and supporting means 3 is formed of a substrate 4 having a reference plane 4a and a reference end face 4b and a plurality of wall members 5 standing at regular intervals D on the reference plane 4a of the substrate 4.

As the wall member 5, there is a double-type wall member as shown in FIGS. 3A and 7A to 7D and a single-type wall member as shown in FIGS. 3D and 9A to 9E in an example. The double-type wall member $5_{DT}$ can arrange and support the two junction terminal blocks 2, 2 in a vertical line direction and the single-type wall member $5_{ST}$ can arrange and support the one junction terminal block 2 in the vertical line direction. Except for this, the two types are formed as completely the same structures.

In the preferred embodiment, the wall member 5 has a horizontal base portion 6 and a vertical wall portion 7 extending vertically upward from the horizontal base portion 6. The horizontal base portion 6 of the wall member 5 is formed of a first face portion 6a aligned with the reference plane 4a of the substrate 4, a second face portion 6b in contact with the reference end face 4b of the substrate 4, and width-direction end faces 6c, 6c for defining the arranging interval D in an arranging direction of the wall members 5 when the adjacent wall members 5, 5 come into contact with each other in an adjoining direction.

In the above structure, the wall members 5 are positioned in an X direction in the drawings by aligning the first face portions 6a with the reference plane 4a of the substrate 4, in a Y direction in the drawings by bringing the second face portions 6b into contact with the reference end faces 4b of the substrate 4, and in a Z direction in the drawings by bringing the width-direction end faces 6c, 6c of the adjacent wall members 5, 5 into contact with each other. According to the example shown in FIG. 3, the vertical wall portion 7 of the wall member 5 is formed with a bolt insertion hole 8 extending vertically and the wall member 5 is fixed onto the substrate 4 through a threaded hole 10 formed in the substrate 4 by using a bolt 9.

Furthermore, the wall member 5 includes engaging supporting means 11 for positioning, fixing and supporting the junction terminal block 2 in the disposed fixed position P1 and the maintenance position P2 and guide means 12 for sliding and guiding the junction terminal block 2 from the disposed fixed position P1 to the maintenance position P2.

The engaging supporting means 11 is provided to a third face portion 13 that is at the vertical wall portion 7 of the wall member 5, orthogonal to the first face portion 6a of the wall member 5, and parallel to the second face portion 6b. The engaging support means 11 includes two projecting lines 14, 14 extending vertically and in parallel to each other at the third face portion 13. For the projecting lines 14, 14, the engaging supporting means 11 includes a first engaging portion 15 to and with which an engaging member of the junction terminal block 2 that will be described later is locked and engaged so as to position, fix, and support the junction terminal block 2 to the disposed fixed position P1 and a second engaging portion 16 to and with which the engaging member of the junction terminal block 2 is locked and engaged so as to position, fix, and support the junction terminal block 2 to the maintenance position P2.

If the third face portion 13 is defined as a reference level $L_0$, the projecting lines 14, 14 between the first engaging portion 15 and second engaging portion 16 are formed at a level $L_1$, i.e., an intermediate height and allow passage of the engaging member of the junction terminal block 2 in a first-level pushing operation of engaging/disengaging operating means in the junction terminal block 2 that will be described later. If the third face portion 13 is defined as the reference level $L_0$, the projecting lines 14, 14 on opposite outsides of the first engaging portion 15 and second engaging portion 16 are formed at the height of the level $L_2$, prevent passage of the engaging member of the junction terminal block 2 in a first-level pushing operation of the engaging/disengaging operating means in the junction terminal block 2 that will be described later, and allow passage of the engaging member of the junction terminal block 2 in a second-level pushing operation to allow releasing of the junction terminal block 2.

On the other hand, the guide means 12 of the wall member 5 is formed of a guide groove 17 provided to the vertical wall portion 7 of the wall member 5 and extending vertically. An end portion 17a of the guide groove 17 functions as a stopper when the junction terminal block 2 is mounted to the junction terminal block arranging and supporting means 3 formed of the wall member.

Next, a concrete structure and an operating form of the junction terminal block 2 applied to the junction connecting device of the invention and an operating procedure of the junction connecting device will be described in detail.

The junction terminal block 2 is integrally molded of a plastic molded body that can be elastically deformed. In the concrete embodiment shown in the drawings, the junction terminal block 2 has the two socket members CS. The junction terminal block 2 has a body portion 18 for supporting the two socket members CS at a desired interval in a vertical direction, the engaging/disengaging operating means 22 connected for a seesaw motion to the body portion 18 through an elastically deformed connecting portion 19 and having a pressing operating portion 20 on one end side and the engaging members 21, 21 to be engaged with the engaging supporting means of the wall member 5 on the other end side, and a guide follower 23 to be engaged for sliding with the guide means 12 of the wall member 5.

In the junction terminal block 2, the engaging member 21 of the junction terminal block 2 is released from the first engaging portion 15 of the wall member 5 by operating the engaging/disengaging operating means 22 and the junction terminal block 2 is slid to engage the engaging member 21 with the second engaging portion 16 of the wall member 5. Thus, the junction terminal block 2 can be operated such that the vertical lines of the junction terminal blocks 2 can be moved from the disposed fixed position P1 to the maintenance position P2 and can be fixed to the positions one line at a time by a one-touch operation.

The engaging/disengaging operating means 22 of the junction terminal block 2 can be operated on the elastically deformed connecting portion 19 as a fulcrum to at least two levels of pushed positions including a first-level pushed position $PP_1$ and a second-level pushed position $PP_2$. In the first-level pushed position $PP_1$, the engaging members 21 of the junction terminal block 2 are released from the first engaging portions 15 of the wall member 5. In the second-level pushed position $PP_2$, the junction terminal block 2 can be released from the wall member 5.

On a side of a pressing operating portion 20 of the engaging/disengaging operating means 22 of the junction terminal block 2, second elastically deformed means 24 for restricting the first-level pushed position $PP_1$ and restoring the pressing operating portion pushed into the second-level pushed position $PP_2$ to the first-level pushed position $PP_1$ is provided.

[Industrial Applicability]

In the junction connecting device of the invention having the above structure, the junction terminal block combined with the wall member is formed of the single structure. Because the number of parts is reduced, manufacturing of the device is easy, the device adaptable to mass production, and the device has advantages in assembly and handling operability, which are extremely effective for this type of device.

Furthermore, the junction connecting device of the invention is formed into a structure extremely rationally. For example, the vertical lines of the junction terminal blocks combined with the wall members can be moved and fixed to disposed fixed positions and maintenance positions one line at a time by a one-touch pressing operation and the junction terminal block can be released from the wall member by the pressing operation of the same portion. This point is also extremely effective.

What is claimed is:

1. A junction connecting device for joining and connecting a large number of connected fiber lines to junction socket members through junction attachment plug members, said device comprising a large number of junction terminal blocks each having at least one socket member and being formed into an integral structure and junction terminal block arranging and supporting means for arranging and supporting said socket members through said junction terminal blocks along first and second direction lines in a matrix shape, wherein said first direction lines out of said respective direction lines of said junction terminal blocks can be moved and fixed to disposed fixed positions and maintenance positions one line at a time by a one-touch operation.

2. A junction connecting device according to claim 1, wherein said junction terminal block arranging and supporting means is formed of a substrate having a reference plane and a reference end face and a plurality of wall members standing at regular intervals on said reference plane of said substrate.

3. A junction connecting device according to claims 1 or 2, wherein said wall member is formed of a first face portion aligned with said reference plane of said substrate, a second face portion in contact with said reference end face of said substrate, and width-direction end faces for defining a pitch width dimension in an arranging direction of said wall members when adjacent wall members are in contact with each other in an adjoining direction.

4. A junction connecting device according to claims 1 or 2, wherein said wall member includes engaging supporting means having a third face portion orthogonal to said first face portion and positioning, fixing, and supporting said junction terminal block in said disposed fixed position and said maintenance position along said third face portion and guide means for sliding and guiding said junction terminal block from said disposed fixed position to said maintenance position.

5. A junction connecting device for joining and connecting a large number of connected fiber lines to junction socket members through junction attachment plug members, said device comprising a large number of junction terminal blocks each having at least one socket member and being formed into an integral structure and junction terminal block arranging and supporting means for arranging and supporting said socket members through said junction terminal blocks along first and second direction lines in a matrix shape, wherein said first direction lines out of said respective direction lines of said junction terminal blocks can be moved and fixed to disposed fixed positions and maintenance positions one line at a time by a one-touch operation, said junction terminal block arranging and supporting means is formed of a plurality of wall members standing at regular intervals, said wall member has engaging supporting means including first and second engaging portions for fixing and supporting said junction terminal block in said disposed fixed position and said maintenance position and guide means for sliding and guiding said junction terminal block from said disposed fixed position to said maintenance position, said junction terminal block is formed of a body portion for supporting said socket member, engaging/disengaging operating means connected for a seesaw motion to said body portion through an elastically deformed connecting portion and having a pressing operating portion on one end side and an engaging member to be engaged with said engaging supporting means of said wall member on the other end side, and a guide follower to be engaged for sliding with said guide means of said wall member, and said engaging member of said junction terminal block is released from said first engaging portion of said wall member to slide said junction terminal block and is engaged with said second engaging portion of said wall member by operating said engaging/disengaging operating means of said junction terminal block.

6. A junction connecting device according to claim 5, wherein said engaging/disengaging operating means of said junction terminal block is operated to first and second at least two levels of pushed positions on said elastically deformed connecting portion as a fulcrum, said engaging member of said junction terminal block can be released from said first engaging portion of said wall member in said first-level pushed position, and said junction terminal block can be released from said wall member in said second-level pushed position.

7. A junction connecting device according to claims 5 and 6, wherein second elastically deformed means for restricting said first-level pushed position and restoring a pressing operating portion pushed into said second-level pushed position to said first-level pushed position is provided on said pressing operating portion side of said engaging/disengaging operating means of said junction terminal block.

* * * * *